Aug. 4, 1942.        W. E. KUENTZEL ET AL        2,291,638
PROCESS AND APPARATUS FOR POLYMERIZING OLEFINS
Filed Aug. 21, 1937        3 Sheets-Sheet 1

Inventors
Ward E. Kuentzel
Carl Max Hull
Emmet R. Kirn
By
Attorney

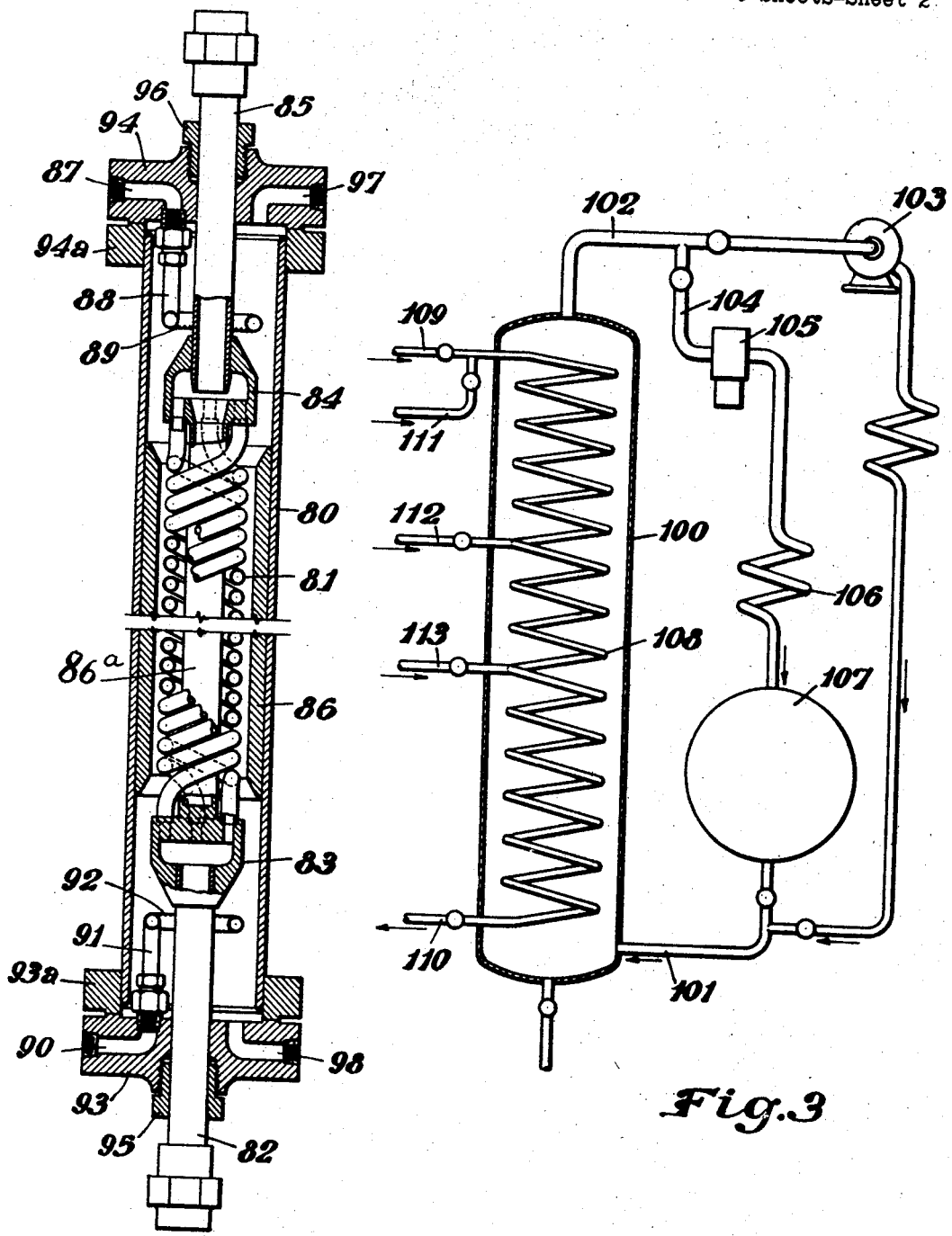

Aug. 4, 1942.   W. E. KUENTZEL ET AL   2,291,638
PROCESS AND APPARATUS FOR POLYMERIZING OLEFINS
Filed Aug. 21, 1937   3 Sheets-Sheet 3

Inventors
Ward E. Kuentzel
Carl Max Hull
Emmet R. Kirn
By Anderson Coombres
Attorney Patented Aug. 4, 1942

2,291,638

UNITED STATES PATENT OFFICE 2,291,638

PROCESS AND APPARATUS FOR POLYMERIZING OLEFINS

Ward E. Kuentzel, Whiting, Ind., Carl Max Hull, Chicago, Ill., and Emmet R. Kirn, Hammond, Ind., assignors to Standard Oil Company, Chicago, Ill., a corporation of Indiana Application August 21, 1937, Serial No. 160,212

8 Claims. (Cl. 260—94)

This invention relates to a process of manufacturing hydrocarbon resins and, in particular, resins produced by the polymerization of unsaturated hydrocarbons with the aid of catalysts. The unsaturated hydrocarbons with which we are most concerned are the low molecular weight olefins, and especially the gaseous olefins such as butylene and isobutylene. The catalysts employed are the halides of amphoteric metals and those metal halides in general which are hydrolyzed by water to form halogen acids. Aluminum chloride and boron fluoride are most suitable, although titanium chloride, stannic chloride, etc., may be used.

One object of the invention is to provide a process and apparatus for carrying out the polymerization of olefins at ordinary and extremely low temperatures, for example as low as −200° F. Another object of the invention is to recover and re-employ the catalyst. Still another object of the invention is to facilitate the handling of the resinous product. Yet another object of the invention is to utilize efficient heat exchange to economize on refrigeration without deleterious effect on the product. Other objects and advantages will be apparent from the following description.

Figure 1:
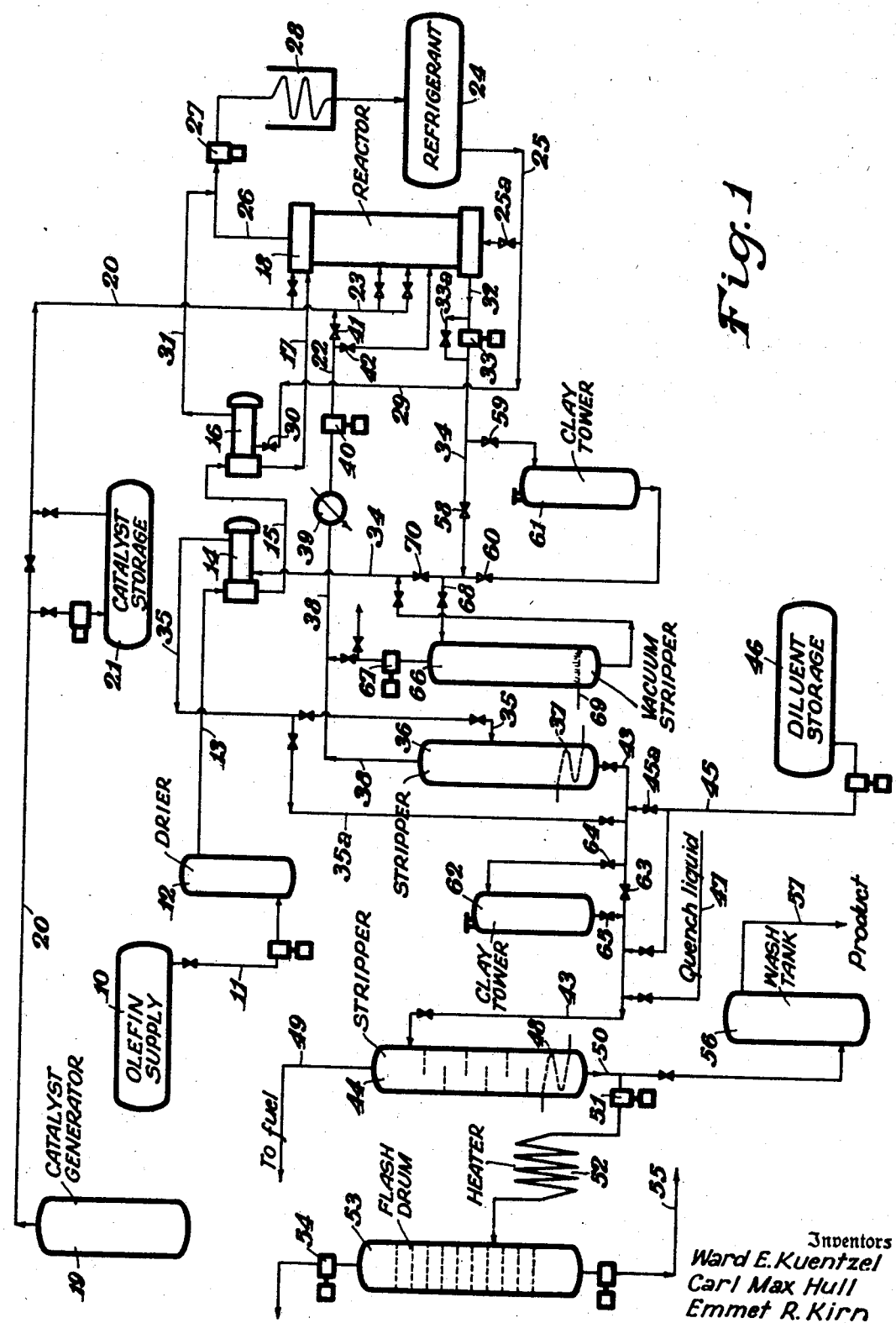
Figure 4:
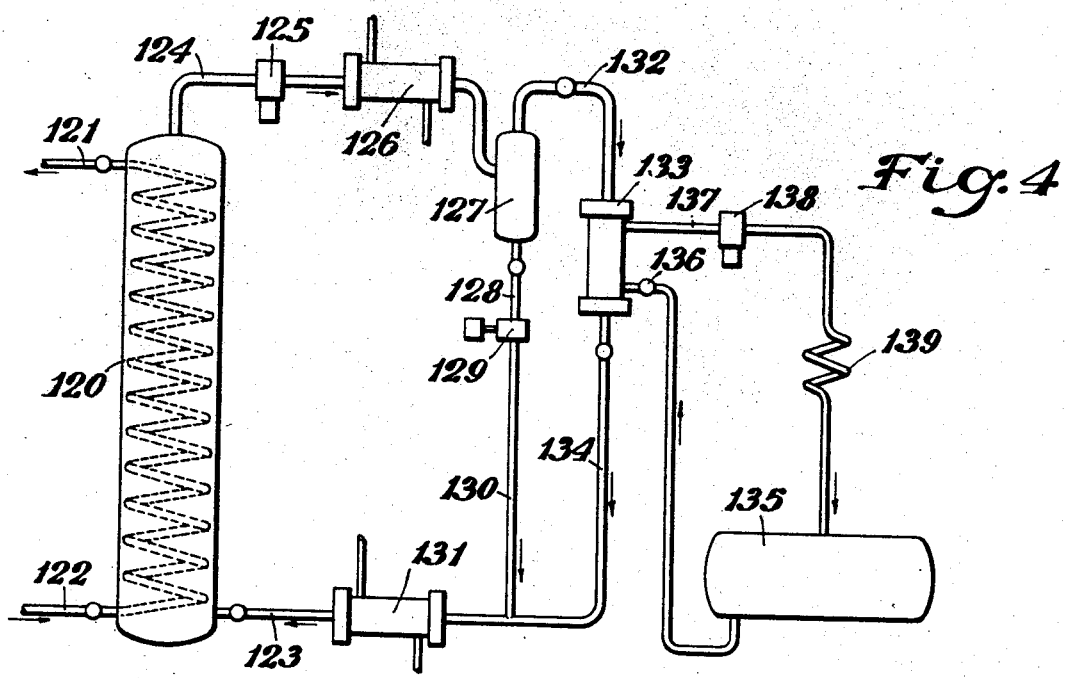
Figure 5:
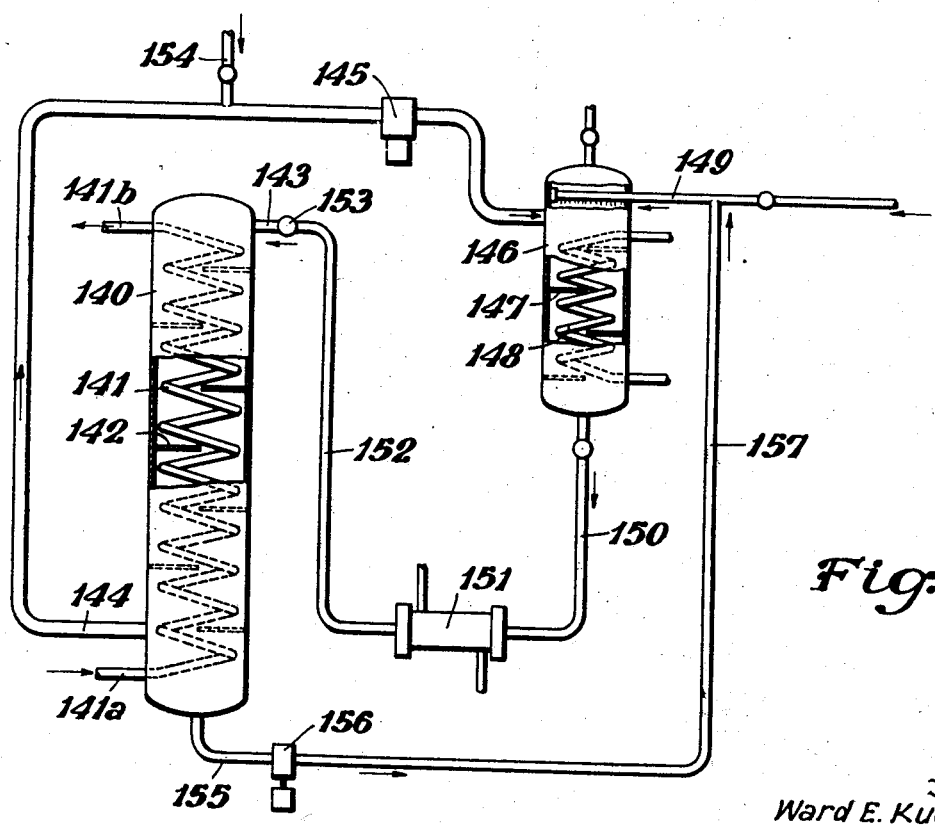

Figure 1 is a diagrammatic drawing showing the process in general lay out. Figure 2 is a more detailed drawing of the reaction chamber 18 in Figure 1. Figure 3 is a modified form of the reaction chamber 18 which may be employed. Figure 4 illustrates a method of refrigerating which may be used in the process. Figure 5 shows a modified form of refrigerating apparatus and method.

Referring to Figure 1, liquid olefins, which may be pure olefins or a mixture such as the butane fraction from a gas absorption plant, consisting largely of butylenes and butanes from cracking still gases, preferably freed from $H_2S$ and other forms of sulfur, are withdrawn from supply tank 10 by valved line 11 leading to drier 12 where moisture contained in the hydrocarbon may be removed by a suitable dehydrating agent such as calcium oxide, calcium chloride, silica gel, etc. We prefer to employ a liquid butane fraction which is substantially free from higher boiling fractions, especially heavier five carbon hydrocarbons which we have found to exert an adverse influence on the course of the polymerization reaction. From the drier the liquid olefins are conducted by line 13 through heat exchanger 14 and thence by line 15 through heat exchanger 16 and thence by line 17 into reaction chamber 18. In passing through heat exchangers 14 and 16 the temperature of the hydrocarbons is successively lowered to the desired reaction temperature which will usually lie between 0° and −100° F. and may go as low as −200° F. A reaction temperature of −80° F. is suitable for the polymerization of isobutylene and somewhat higher temperatures may be used for the polymerization of other olefins.

In the reaction chamber 18 there is provided means for absorbing the heat of reaction produced by the polymerization of the olefins, apparatus for this purpose being shown in greater detail in Figure 2. Referring to Figure 1, into the stream of cold liquid olefin hydrocarbon in reaction chamber 18 there is introduced a suitable catalyst which may be boron fluoride. Boron fluoride may be produced in generator 19 by the interaction of ammonium fluoborate, boric acid and sulfuric acid, whence it is led by line 20 to reaction chamber 18. If desired, it may be compressed and stored in storage cylinder 21 from which it can be conveniently withdrawn as needed. Additional recycled catalyst may be introduced by line 22 as will be hereinafter described. The catalyst may also be introduced by line 23 at a point near the opposite end of the reaction chamber from the hydrocarbon inlet in order to obtain countercurrent treatment described more fully in connection with Figure 2. The amount of $BF_3$ added is sufficient to produce a catalyst concentration of .05 to 0.1% of the hydrocarbon treated, although larger amounts, e. g., 0.2 to 1%, may be employed to obtain rapid reaction, the unreacted portion being recycled as hereinafter described.

The reaction chamber 18 may be constructed in different ways, but it is essential that it provide a large surface for heat exchange between the olefin hydrocarbons undergoing polymerization and the cooling agent. Refrigerant for the reaction chamber, which may be liquid methane, liquid ethane, liquid $CO_2$, etc., may be withdrawn from storage tank 24 by line 25 through a throttling valve 25a, and the refrigerant vapor may be withdrawn from the reaction chamber, conducted by line 26 to compressor 27 and condenser 28 and returned to storage tank 24. Refrigerant vapors in line 25 may be heat exchanged with feed to reactor 18 if desired. Refrigerant may be drawn from the same storage tank 24 by lines 25 and 29 to provide cooling in exchanger 16. The expansion of the refrigerant through valve 30 produces the desired degree of cooling for the liquid hydrocarbons prior to introducing the catalyst, and the refrigerant vapors are conducted by line 31 to compressor 27 previously described.

Liquid ethane or ethylene or ethylene-propane mixtures may suitably be employed as refrigerants and have advantages over carbon dioxide in their freedom from solidification at low temperatures. Where carbon dioxide is used at temperatures as low as −70° F. or lower, it is advisable to employ acetone, ether or other suitable organic liquid in reactor 18 to prevent the carbon dioxide from solidifying. The reaction chamber 18 is constructed to provide sufficient reaction time at the low temperature to bring about the desired polymerization of isobutylene. In the case of polymerization of isobutylene with an excess of boron fluoride at −80° F. a reaction time of approximately 5 minutes should be provided, the volume of the reaction chamber 18 and the rate of flow of olefins being taken into consideration. From the reaction chamber 18 the polymerized hydrocarbon mixture is led by line 32 to pump 33 where it is forced through line 34 to heat exchanger 14 where it serves to preliminarily refrigerate the olefins in line 13. If desired, sufficient pressure may be employed in the reactor 18 to make the use of pump 33 unnecessary, in which case by-pass 33a may be used. Because of the low temperature of the stream in line 32 difficulty has been found in lubricating pump 33 and this problem has been successfully solved by employing as the lubricant a solution of the reaction product in liquid butane. A concentration of about 20 to 30% of the resin in liquid butane is satisfactory and the solution will not congeal at the low temperatures employed. Leaving heat exchanger 14 by valved line 35, the mixture of polymerized hydrocarbons is introduced into drum 36 where it is subjected to gentle heating by means of coil 37. Sufficient heating is supplied to evaporate from the mixture, part of the light hydrocarbons and substantially all the uncombined portion of the boron fluoride catalyst, the vapors of which are conducted by line 38 to cooler 39 and compressor 40, thence by line 22 to reaction chamber 18. In this way the uncombined portion of the catalyst is conveniently recirculated and used repeatedly. Instead of being directly admitted into reaction chamber 18 by line 22 the recovered catalyst may be introduced into the fresh catalyst supply line 23 by opening valve 41 and closing valve 42.

From the base of drum 36 a mixture of polymerized hydrocarbons is withdrawn by line 43 to stripper 44 wherein substantially all the light hydrocarbons are removed from the polymerized product. In order to facilitate handling the viscous product of polymerization a suitable diluent may be introduced by line 45 from supply tank 46. Hexane, benzene or other solvent, for example hydrocarbon lubricating oil, may be employed for this purpose. The amount of diluent thus added may conveniently be from one to four times the volume of the resinous product contained in the hydrocarbon mixture leaving drum 36. A particularly suitable diluent is a light lubricating oil of S. A. E. 10, 20 or 30 grade or straw oil which may be allowed to remain with the product when subsequently used for lubricating oil blending purposes. Technical white oil may be used where a colorless product is desired.

We may also introduce by line 47 a suitable quenching liquid such as alcohol, moist acetone, liquid ammonia, alcoholic sodium hydroxide, etc., which reacts with and deactivates any residual catalyst not removed in drum 36 or previously. As a result, further action of catalyst on the product and on other hydrocarbons is substantially prevented at the more elevated temperatures in stripping tower 44. We may also wash the polymer product in the butane solution at this point in the process by contacting with aqueous sodium hydroxide or other alkali, preferably followed by water, means for accomplishing this not being illustrated in the drawings. Formation of color in the product is thus prevented by complete neutralization.

Stripping tower 44 is preferably operated without the use of live steam, heat being supplied by closed coil 48. Butane is driven off through vapor line 49 and may be discarded from the system as fuel gas or partially condensed and recycled as a diluent for the olefin hydrocarbon entering the process, if desired. The polymerization product containing some residual butane in solution, for example 1 to 20%, is withdrawn from the base of stripper 44 and conducted by line 50 and pump 51 to heating coil 52 where it is heated to an elevated temperature, for example 200 to 350° F., and discharged into flash drum 53. If the product has not been completely neutralized previous to stripper 44, it is preferred to subject it to further washing with sodium hydroxide or other alkali and water after leaving stripper 44 and before introducing into heater 52 in order to prevent decomposition and formation of color. Drum 53 may suitably be maintained under vacuum by exhauster 54 and the butane-free product may be withdrawn by line 55.

In the case where the product has been diluted with a heavy hydrocarbon oil introduced from tank 46 the diluent will be retained in the solution and the diluted product thus obtained may be employed directly for the treatment of lubricating oils, etc. Where lighter diluents, such as hexane, light naphtha, etc., are employed as diluents these will be removed in flash drum 53 along with residual butane.

Where it is unnecessary to completely remove the light diluent from the product, it may be withdrawn from the base of stripper 44 by opening the valve in line 50 and discharging through wash tank 56 where an alkali wash may be employed to remove the final traces of acid or catalyst in the case where the stock has not been completely neutralized before entering stripper 44. The product is thereafter discharged through line 57. This alternative method of treating the product may be employed when it is used in the preparation of coating compositions, etc., where it is employed in solution in volatile solvents.

Instead of recovering catalyst by distillation from drum 36 in the manner described, we may alternatively employ an adsorbent for this purpose. Thus, by closing valve 58 in line 34 and opening valves 59 and 60 in the lines leading to chamber 61 we may divert the cold reaction stream through a bed of suitable adsorbent retained in chamber 61. Granulated fuller's earth may be used for this purpose, aluminum silicate, silica gel, etc. The adsorbent employed in this manner removes the uncombined catalyst together with any catalyst sludge of complex compounds contained in the reaction products. If desired, excess catalyst may be recovered from the fuller's earth by isolating the chamber 61 from the system and raising the temperature, the catalyst being swept from the adsorbent by hydrocarbon vapor stream and conducted back into the polymerization system.

In a similar manner we may also divert the stream passing through line 43 into decolorizing chamber 62 suitably charged with fuller's earth or other decolorizing adsorbent, valves 63, 64 and 65 being provided for this purpose. When so operating we may introduce a light diluent naphtha, lubricating oil or other diluent through valved line 45a if desired. When employing adsorbent tower 62 we find it unnecessary to introduce a quenching agent through line 47 as previously described, since the adsorbent may be employed to remove any traces of catalyst which, if left in the reaction product, would promote undesirable polymerization or depolymerization and deterioration, when heated to a higher temperature in stripper 44 for example. Instead of removing the catalyst from the stock in line 34 by means of the adsorbent chamber 61 we may alternatively accomplish this by vacuum distillation, stripper 66 being provided for this purpose. Vacuum pump 67 serves to maintain a low pressure of the order of 5 to 50 mm. mercury and the hydrocarbon reaction product charged to the stripper by line 68 is substantially denuded of volatile $BF_3$ catalyst, some low boiling hydrocarbons being simultaneously withdrawn. If desired, this hydrocarbon vapor containing active catalyst may be recycled to the reaction chamber by way of line 38. Heat and/or inert stripping gas may be introduced to the base of stripper 66 by line 69 if desired. A suitable valve 70 is provided to divert the stream of hydrocarbon reaction products into the vacuum stripper. When employing stripper 66 to remove excess catalyst we may immediately thereafter introduce into the reaction stream a catalyst quenching liquid such as alcohol, liquid ammonia, etc., hereinbefore described.

When employing clay tower 61 or vacuum stripper 66 to remove excess catalyst it will not be necessary to subsequently remove catalyst from the reacton products subsequent to heat exchange in exchanger 14. In that case stripper 36 may be by-passed by conducting the stock through valved line 35a.

Referring to Figure 2 for a more detailed description of the reaction chamber, casing 80 surrounds refrigerator coil 81 which is supplied with refrigerating liquid through pipe 82. The coil 81 is suitably comprised of three or more concentric nested spirals connected on the inlet end to header 83 and at the outlet end to header 84 leading to refrigerant discharge pipe 85. In order to reduce the free space in the reactor and confine the stream of reacting liquid to close contact with the refrigerator coil 81, a filler or liner 86, suitably made of aluminum, $KA_2$ which is an alloy steel containing about 18% chromium and 8% nickel, monel, or other material not attacked by reactants, may be employed. Similarly core 86a may occupy the space within the spiral coils 81.

Olefin hydrocarbon liquid which has been precooled is introduced into the reaction chamber through feed inlet 87 which, if desired, may be connected by pipe 88 to distributor ring 89. A similar arrangement may be employed at the bottom for introducing the catalyst which may be a solution or a gas, for example $BF_3$. Catalyst inlet 90 may be connected by pipe 91 to catalyst distributor 92. If desired the point of introduction of the catalyst may be shifted to the center or to any point in the reaction tower by extending or shortening pipe 91.

Removable heads 93 and 94 bolted to flanges 93a and 94a, which in turn are welded to casing 80, are provided with the proper passages for introducing and withdrawing materials from the reaction chamber, making pyrometer connections, etc. For convenience in assembling they are provided with packing glands and nuts 95 and 96.

When operated in the vapor filled manner the reaction chamber permits the hydrocarbon to cascade over the cooling coil 81 in counterflow to vapors of the $BF_3$ catalyst, thus absorbing $BF_3$ gradually and permitting complete utilization of catalyst and giving the desired control of the reaction. The reaction chamber may also be operated with the cooling coil 81 submerged, in which case the $BF_3$ catalyst gas may enter the liquid and be absorbed before escaping from the vent 97. Because of more rapid absorption of catalyst in the latter case it is desirable to introduce the catalyst at an intermediate point in the reaction chamber between the refrigerating coil headers 83 and 84 in order to provide time and space for the reaction to take place before the hydrocarbons escape from the chamber. The polymerized product is withdrawn from the reaction chamber through outlet 98.

Referring to Figure 3 which describes a modified form of reaction chamber, casing or tower 100 is provided for refrigerant inlet 101 and outlet 102. Any suitable refrigerant may be employed, for example cold brine, cold oil, liquid ammonia, liquid propane and, for very low temperatures, liquid ethane or liquid methane may be used in sufficient quantity to substantially fill the tower 100. Hydrostatic pressure on the refrigerant may be avoided by applying it as a froth or spray. By using liquid ethane a temperature of $-100°$ F. may conveniently be obtained and if lower temperatures are desired the pressure in the tower may be reduced by vacuum pump 103. If liquid ammonia or propane are used temperatures of about $-40°$ F. may be obtained which may be still further reduced to $-60°$ F. or below by use of vacuum. The vapors withdrawn through refrigerant outlet 102 may be conducted by by-pass line 104 to compressor 105 and condenser 106 leading to refrigerant receiver 107 whence refrigerant is allowed to expand again in reaction chamber 100. In the case where brine or other liquid unvaporized refrigerant is used additional refrigerating means are required to externally cool it to the desired temperature.

Within the chamber 100 is located reaction coil 108 with inlet 109 and outlet 110. The coil 108 may suitably be a series-connected arrangement of flat spiral coils commonly known as pancake coils, but any suitable arrangement for passing the reacting hydrocarbons through the chamber in a confined stream surrounded by indirect refrigeration may be employed. A multiple coil of small diameter tubing may be employed to insure rapid heat transfer between the reacting mixture and the surrounding refrigerant. The liquid isobutylene mixture is forced through the coil at a rapid rate and it is desired that it be precooled by external heat exchange to the desired reaction temperature before entering reaction chamber 100. If it is properly precooled, the catalyst, for example $BF_3$ or $AlCl_3$ solution or suspension, may be introduced at the inlet of the coil through pipe 111 but to obtain more uniform control of the reaction the catalyst may be distributed throughout the length of the coil 108 by introducing it at one or more intermediate points simultaneously if desired, viz: 112, 113, etc.

In order to more conveniently obtain the low temperature necessary for conducting the polymerization of isobutylene we may employ the apparatus described in Figure 4 in which the reaction chamber 120 with coil connections 121 and 122, refrigerant inlet 123 and outlet 124, is shown connected to suitable apparatus for supplying a low boiling refrigerant liquid such as liquid ethane. Liquid isobutylene alone or in solution in a suitable diluent is preliminarily cooled by heat exchangers not shown but similar to exchangers 14 and 16 in Fig. 1 where the isobutylene stream is countercurrently chilled by the refrigerant. It is then introduced into the reaction coil in chamber 120 where it is cooled concurrently with the refrigerant introduced by line 123. The catalyst is preferably introduced into line 122 at the inlet of the reaction chamber after the temperature of the butylene stream has been reduced to the desired reaction temperature. The concurrent cooling in reaction chamber 120 serves to supply maximum cooling immediately following the introduction of catalyst, thus removing the heat of reaction rapidly at the point where the exothermic heat is greatest.

In view of the rather low critical temperature of ethane, i. e., 90° F., it is sometimes difficult to liquefy it in the summertime when cooling water temperatures are relatively high. This problem is still more aggravated when using methane. At these times we may conduct the ethane gas through line 124 to compressor 125 where it is compressed and passed through cooler 126 suitably supplied with cooling water. From the cooler the gas passes to trap 127 where any liquefied portion of the gas, particularly any heavier impurities, which may be at a temperature of between 80 to 90° F., is collected and removed by line 128 and liquid transfer pump 129 which returns the liquid ethane to the reaction chamber 120 by line 130 and cooler 131 and line 123.

Any uncondensed ethane is withdrawn from trap 127 and conducted by line 132 and condenser 133 which is supplied with a refrigerant from an auxiliary refrigerating system. A suitable refrigerant for this purpose is liquid ammonia, liquid propane, liquid butane, liquid $SO_2$, dichlor difluor methane, etc. By this means the temperature in 133 is reduced substantially below the critical temperature of ethane and no difficulty is encountered in liquefying the remainder of the gas which may not liquefy in cooler 126. The liquid ethane from cooler 133 is conducted by line 134 to cooler 131 and line 123 back to the reaction chamber 120. Liquid methane may similarly be used for lower temperatures.

To describe the auxiliary refrigerant apparatus briefly, the auxiliary refrigerant, which may be liquid $SO_2$ contained in tank 135, is expanded through valve 136 into cooler 133 and the vapors are withdrawn by line 137 leading to compressor 138 which, in turn, discharges the vapors into condenser coil 139 whence the refrigerant flows back to the auxiliary refrigerant supply tank 135. Auxiliary refrigerant may likewise be used to cool the liquid ethane in cooler 131 for example to a temperature of −50° F., thus conserving refrigeration necessary to maintain the low temperatures of the reaction chamber 120. Alternatively, if desired, cooler 131 may be a heat exchanger supplied with cold gas from line 124.

In order to avoid difficulty with the condensation of ethane because of its rather low critical condensation temperature and also to obtain greater flexibility in choice of evaporation temperature, we may resort to the practice of introducing into the ethane or ethylene a relatively small amount of higher boiling hydrocarbon such as propane, butane or hexane, the effect of which addition is to raise the critical condensation temperature above that of pure ethane or ethylene gas. The evaporation temperature is also raised somewhat by the addition of the heavier hydrocarbon, but the amount of heavier hydrocarbon required will usually be relatively small and if the refrigerant is employed in a countercurrent manner the minimum temperature obtainable will not be greatly affected. By using the proper proportions of ethylene and propane, for example, we may thus approximate the physical properties of ethane with respect to evaporation temperature and critical condensation temperature as we may also do by properly mixing ethylene with butane, pentane or hexane. Apparatus for refrigerating in this manner is shown in Figure 5. Reaction chamber 140 equipped with hydrocarbon liquid coil 141 with inlet 141a and outlet 141b, refrigerant inlet 143 and outlet 144, is connected to a suitable refrigerant supply. Chamber 140 is equipped with suitable baffles 142 to insure contact between liquid cascading therein and the coil 141. Vapors in chamber 140, consisting in a large part of the lower component of the mixed refrigerant, are withdrawn by vapor line 144 leading to compressor 145 and condenser 146. An increasing proportion of the higher boiling component or components and a decreasing proportion of the lower boiling component cascade to the lower part of the chamber 140 in the liquid phase forming a liquid layer with surface below the vapor outlet line 144. Compressor 145 may suitably increase the pressure to about 400 to 700 pounds per square inch which is maintained in condenser 146. Condenser 146 may contain suitable baffles 147 and cooling coil 148 supplied with cooling water.

Liquid propane, butane, hexane, etc., may be introduced into the condenser through line 149 in small amounts as needed to raise the critical temperature of the ethane gas sufficient for condensation by contact with the cooling coil 148. The condensed ethane, carrying some higher boiling hydrocarbon in solution, is then conducted by line 150 to cooler 151 and line 152 back to chamber 140, the pressure being reduced on entering chamber 140 by expansion valve 153. Additional ethane or the higher boiling hydrocarbon may be introduced into the system from time to time as needed by inlet 154.

Unevaporated liquid collected in the base of tower 140 is withdrawn by line 155 and pump 156 and returned through line 157 to the upper part of the condenser 146 wherein it is distributed through inlet 149. In this way any higher boiling hydrocarbon which does not evaporate in the tower 140 is prevented from accumulating therein and is brought back to the absorber where its effect in raising the critical temperature of the ethane therein is maintained.

In still another modification of our invention we may conduct the polymerization reaction in direct contact with the refrigerant employed to maintain the desired low temperature. Thus we may add liquid propane or ethane to the olefin hydrocarbon, precool the mixture and introduce it into the reaction chamber where it is brought into contact with the catalyst. In this case the reaction chamber may be provided with no refrigerating means but merely with suitable heat insulation to conserve refrigeration.

When using this method the temperature of the reaction may be controlled by regulating the pressure to which the reaction chamber is subjected. Thus, by employing liquid ethane as the refrigerant in direct contact with the reaction mixture at atmospheric pressure a temperature of about −120° F. may be obtained; employing liquid propane at atmospheric pressure, a temperature of about −40° F. may be obtained.

If desired, the liquid refrigerant may be introduced at the lower end of the reaction chamber and the olefin hydrocarbon at a higher point and the extent of refrigeration may be obtained by regulating the rate of introducing refrigerant as well as the pressure. When employing direct contact refrigeration in this manner the vapors of the refrigerant escaping from the reaction chamber may carry away a portion of the catalyst in vapor form, especially in the case of boron trifluoride which has a high vapor pressure. By liquefying and recirculating the refrigerant vapors containing catalyst, any catalyst removed in this way may be returned to the system without incurring loss of valuable catalytic material.

Although several catalysts may be employed for carrying out the present process the boron fluoride catalyst is advantageous because of the fact that it is gas even at very low temperatures and can be readily manipulated and recovered by evaporation from the reaction products. In the case of other catalysts which are not gaseous, such as aluminum chloride, it is convenient and sometimes necessary to use them in the form of solutions in solvents which may be other fluid metal halides, organic solvents, such as nitrobenzene, etc. If desired, the boron fluoride may be supplemented by other catalysts and also promoted by halogen acids, particularly hydrogen fluoride and hydrogen chloride. Where aluminum chloride is used continuously it may conveniently be added in the form of a slurry or suspension for which purpose a portion of the unreacted hydrocarbon material obtained from the process may be recirculated.

In a typical operation of our process we may employ a mixture of butanes and butylenes containing about 20% of isobutylene which it is desired to polymerize. The hydrocarbons may be cooled to a temperature of −100° F. and charged to the reactor at the rate of 10 gals. per min. At the point of entering the reactor boron fluoride may be introduced at the rate of 4 to 5 pounds per hour which is equivalent to about 0.15%. We have found that from about .02 to .08% by weight of boron fluoride, depending on the amount of poisons present such as sulfur compounds, is used up in the process, thus leaving from .05 to .13% to be recovered and recirculated in this operation. Where a more rapid reaction rate is desired higher concentrations of catalyst may be employed and the excess may be recovered and recirculated substantially without loss.

Cooling is provided in the reactor at a sufficient rate to maintain the temperature below −70° F. Unused boron fluoride is recovered from the reaction product in an amount of about 2-4 pounds per hour which is recycled to the reactor. The unchanged butanes and butylenes are removed and substituted by hexane to give a final product containing approximately 20% of hydrocarbon resin in hexane solution. The amount of resin obtained is 100 pounds per 100 gals. of butane-butylene mixture charged to the apparatus.

In order to obtain the "dry" resin free from solvent it may be evaporated, care being taken to avoid loss by foaming. A suitable film type evaporator may be used for this purpose. Alternatively, the resin may be retained in butane solution as produced in the process, a small pressure being required and no diluent being employed as shown in Figure 1 by line 45. The butane solution of resin may be heated under pressure, preferably after neutralizing and washing to remove all traces of catalyst, as a result of which heating a major portion of the resin is precipitated from the solution. Any temperature in the vicinity of the critical temperature of butane may be used for this purpose and, in fact, a temperature of 150° to 250° F. is sufficiently high to precipitate most of the desired heavy isobutylene polymers. Lighter polymers of molecular weights substantially below 1000 remain in solution in the liquid butane and may be subsequently recovered for use as lubricating oils and in lubricating oil blending.

Another method of recovering catalyst which is somewhat more involved than those described hereinbefore consists in treating the cold reaction products from reaction chamber 18 with anhydrous ammonia in sufficient quantity to react with all boron fluoride present, forming an ammonium complex with $BF_3$ which is removed from the system and regenerated by heating or treating with an acid, e. g., $H_2SO_4$. The complex ammonium compound may be removed from the system by adsorption on fuller's earth or similar means.

The resin produced by our process and apparatus is a substantially colorless, odorless, non-volatile plastic substance characterized by a very high molecular weight, usually within the range of 1,000 to 12,000, but molecular weights of 20,000 to 30,000 may be obtained. Its density is slightly less than that of water and its refractive index is about 1.503 to 1.507. The resin retains its plastic nature over wide ranges of temperature, down to −100° F. and lower, although at the temperature of liquid air it becomes a brittle solid. At elevated temperatures it becomes soft and semi-fluid but never completely loses its viscidity.

Although we have described our process particularly as applied to the manufacture of a viscous plastic resin, certain features of the process may obviously be applied equally well to the manufacture of lower molecular weight products from olefins and we have found that by conducting the reaction at higher temperatures, in the region of −40° F. to +100° F. for example, we obtain oily products rather than semi-solid polymers, such oily products being substantially colorless and valuable as lubricating oils, either alone or blended with other oils. A typical synthetic lubricating oil produced at 35° F., for example, may have a viscosity of between 150 and 200 seconds Saybolt at 210° F. and a viscosity index of 110 to 130. In addition to the high viscosity index it is characterized by a low pour point and extremely low carbon residue, about 0.1%. These oils have been found especially suitable for use in shock absorbers and other apparatus requiring oils of low susceptibility to temperature change and low pour point.

We have described the polymerization of a commercial butane fraction containing isobutylene but we may also employ solutions of pure isobutylene with suitable diluents. We prefer not to employ undiluted isobutylene because of the difficulty of handling the viscous product in the polymerizer and lines. Examples of diluents which may be employed are hexane, propane, naphtha, etc.

A commercial butane fraction obtained from the cracking of gas oil and other petroleum oils will usually contain about 15% of isobutylene, although concentrations from about 10 to 25% may conveniently be employed in our process. The remainder of the commercial butane fraction will usually be normal butane, normal butylene and isobutane with small amounts of propane and propylene. As previously mentioned, we prefer to fractionate out from the raw material the fraction boiling in the range of pentenes when it is desired to obtain a high molecular weight resin. The amount of this fraction should preferably be reduced to 10% or less based on isobutylene present to avoid the undesirable effect of reducing the molecular weight of the product.

Although we have described our process with respect to certain specific examples, we intend that it be limited only by the following claims.

We claim:

1. In the process of converting olefin hydrocarbons to high molecular weight hydrocarbon products wherein said olefin hydrocarbons are treated with an excess of a polymerizing catalyst which is subsequently recovered therefrom, the improvement comprising continuously cooling a stream of said olefin hydrocarbons to a desired low reaction temperature, introducing a stream of polymerizing catalyst into said hydrocarbon stream in a refrigerated reaction zone, regulating the rate of flow of said olefin hydrocarbon stream to substantially complete the desired polymerization reaction, removing the heat of polymerization from said reaction zone by rapid indirect refrigeration, regulating the extent of said refrigeration in said reaction zone to maintain the desired polymerization temperature within the said reaction zone, continuously withdrawing reaction products from said reaction zone, recovering excess catalyst from said reaction products substantially without raising the temperature thereof, subsequently heating the reaction products by passing them in indirect heat exchange relationship with said olefin hydrocarbons prior to treatment with said catalyst and thereafter removing from said reaction products any remaining catalyst not removed prior to said heat exchange.

2. The process of claim 1 wherein the excess catalyst is recovered by continuous distillation under vacuum.

3. The process of claim 1 wherein said excess catalyst is recovered by contacting said reaction products with fuller's earth.

4. The apparatus for continuously intermingling an olefin containing hydrocarbon and a fluid catalyst and for effecting polymerization of said olefin by said catalyst at a desired low temperature and absorbing the heat of polymerization at a rate sufficiently rapid to prevent a substantial rise in temperature above the desired point, comprising an elongated casing, a spirally wound refrigerant conducting coil within said casing, a hollow core within said coil substantially restricting the free space within said casing to the region of said coil, means for continuously forcing hydrocarbon fluid through said casing and through the free space contiguous to said coil and means for continuously introducing a catalyst into the said free space contiguous to said coil, whereby the olefin constituents of said hydrocarbon stream are polymerized in contact with said refrigerating coil and means for withdrawing the polymerized hydrocarbon products from said reaction chamber.

5. The apparatus of claim 4 wherein said core within said coil is connected to a source of refrigerant whereby the external surface thereof is cooled to a low temperature.

6. The apparatus of claim 4 wherein means are provided for supplying a refrigerant liquid of substantially constant boiling point, under predetermined pressure, to the interior of said coil and said core placed therein.

7. In the process of manufacturing plastic synthetic hydrocarbon resins by the polymerization of olefin hydrocarbons at low temperature with an active metal halide catalyst wherein the liquid olefin hydrocarbon, admixed with inert light hydrocarbons, is cooled to the desired low temperature, the catalyst is introduced, the hydrocarbon-catalyst mixture is agitated in contact with refrigerated surfaces whereby the heat of reaction is absorbed without substantial rise in temperature, the reaction products are treated to remove excess catalyst and a major portion of the unreacted light hydrocarbons is evaporated, the improvement comprising removing from the plastic polymerization product the minor amount of inert hydrocarbons remaining, by heating the product in a restricted stream to a temperature below the dissociation temperature of said product and below the boiling point of the inert hydrocarbons, to reduce the viscosity of the plastic mass and then discharging the heated and fluid product into a zone of lower pressure whereby remaining inert hydrocarbons are instantaneously vaporized by the contained heat of the product and a substantially solvent-free plastic synthetic resinous product is obtained as residue.

8. In the process of polymerizing liquid isobutylene and solutions thereof by contacting with boron fluoride at a low temperature, the improvement comprising countercurrently refrigerating a stream of said liquid isobutylene to the desired reaction temperature, by indirect cooling with a refrigerant stream, introducing the required amount of said boron fluoride catalyst and immediately thereafter concurrently refrigerating said isobutylene stream by indirect cooling with a refrigerant stream and maintaining a maximum rate of refrigeration in the region of said isobutylene stream where the exothermic heat generated by the polymerization reaction is a maximum.

WARD E. KUENTZEL.
CARL MAX HULL.
EMMET R. KIRN.